(12) United States Patent
Payne

(10) Patent No.: US 9,129,534 B2
(45) Date of Patent: Sep. 8, 2015

(54) ROPING TRAINING DEVICE

(71) Applicant: Eric Payne, Whitefish, MT (US)

(72) Inventor: Eric Payne, Whitefish, MT (US)

( * ) Notice: Subject to any disclaimer, the term of this patent is extended or adjusted under 35 U.S.C. 154(b) by 170 days.

(21) Appl. No.: 13/833,351

(22) Filed: Mar. 15, 2013

(65) Prior Publication Data

US 2014/0261237 A1   Sep. 18, 2014

(51) Int. Cl.
*A01K 15/02*   (2006.01)
*G09B 19/00*   (2006.01)

(52) U.S. Cl.
CPC .................................. *G09B 19/003* (2013.01)

(58) Field of Classification Search
CPC ....... A01K 15/00; A01K 15/02; A01K 15/04; G09B 19/003
USPC ........ 119/839, 712; 54/71; 73/866.4; 40/411, 40/538; 434/225, 247; 472/59, 60, 97; 348/61; D14/371; 273/338, 359
See application file for complete search history.

(56) References Cited

U.S. PATENT DOCUMENTS

| | | | |
|---|---|---|---|
| 4,819,076 A * | 4/1989 | Briggs | 348/211.11 |
| 4,988,300 A * | 1/1991 | Yamaguchi et al. | 434/247 |
| 4,995,618 A * | 2/1991 | Panzner | 273/367 |
| 5,080,373 A | 1/1992 | Jones | |
| 5,568,926 A | 10/1996 | Kaptein | |
| 5,904,484 A | 5/1999 | Burns | |
| 6,422,956 B1 | 7/2002 | Kusmiss | |
| 6,497,411 B1 | 12/2002 | Nelson | |
| 6,736,399 B1 | 5/2004 | Copenhaver | |
| 6,866,594 B2 * | 3/2005 | Greenwood | 473/422 |
| 7,018,211 B1 | 3/2006 | Birkhoelzer et al. | |
| 7,095,388 B2 | 8/2006 | Truxa et al. | |
| 7,293,775 B1 | 11/2007 | Donnelly | |
| 7,430,990 B1 | 10/2008 | Copenhaver | |
| 7,749,088 B2 * | 7/2010 | Greenwood | 472/97 |
| 7,988,522 B2 * | 8/2011 | Chen | 446/376 |
| 8,297,980 B2 | 10/2012 | Reynolds | |
| 2002/0058237 A1 * | 5/2002 | Kernan | 434/247 |
| 2002/0155417 A1 | 10/2002 | Browne et al. | |
| 2003/0044757 A1 | 3/2003 | Tarry et al. | |
| 2005/0282128 A1 | 12/2005 | Brinkerhoff et al. | |
| 2006/0170163 A1 | 8/2006 | Perkins | |
| 2007/0017456 A1 | 1/2007 | Huett | |
| 2011/0172822 A1 * | 7/2011 | Ziegler et al. | 700/259 |
| 2011/0275041 A1 | 11/2011 | Reynolds | |

* cited by examiner

*Primary Examiner* — Rob Swiatek
*Assistant Examiner* — Ebony Evans
(74) *Attorney, Agent, or Firm* — Endurance Law Group PLC

(57) ABSTRACT

A roping training dummy is claimed comprising a dummy representing an animal having a target to be lassoed by a roper. A position sensor, such as video camera or radar system, is disposed on the dummy for monitoring the real-time position of the roper relative to the lasso target. A monitor on the dummy is visible to the roper and operatively connected to the position sensor. The monitor displays the roper's real-time position and a positional reference corresponding to a preferred roper placement.

20 Claims, 5 Drawing Sheets

ROPING TRAINING DEVICE

BACKGROUND OF THE INVENTION

1. Field of the Invention

Rodeos have grown in popularity. In particular, competitive roping has attracted a growing number of spectators and participants. The sport entails an individual or team throwing a rope, or lasso, to ensnare a calf or steer. The animal may be ensnared by the head, horns, or leg(s). In order to improve their success rate, ropers must practice their roping skills. Practicing on live calves and steers, however, is frequently inconvenient, expensive, or otherwise impractical. As a result, both amateur and professional rodeo ropers frequently employ roping dummies to practice their skills. These roping dummies superficially resemble a calf or steer, with the head, horns, and/or legs configured to be ensnared by a lasso. The dummy can be stationary or mobile, with the latter configured to be pulled by a motor vehicle. Roping dummies are available from a variety of manufacturers, including Heel-O-Matic, whose information is accessible at www.heelomatic.com.

It is important when attempting to lasso a calf or steer for the roper to place himself in a favorable throwing position relative to the animal. Through instruction and experience, a roper develops an optimum distance and orientation relative to the target to increase his ensnarement success rate, and then typically seeks to position himself in that optimum position. The roper's preferred placement can vary depending on the user's stature, technique, strength, lariat characteristics, as well as the size and orientation of the target animal. Furthermore, the user's preferred positioning can vary depending on whether the roper is on foot, on horseback, whether the target is moving or stationary, the speed and configuration of the target, and many other factors. All of these variables make calf-roping a challenging experience.

When practicing with a stationary roping dummy, it is possible to manually measure the roper's preferred distance and angle of orientation from the dummy and practice roping from that location. This technique, however, requires re-measurement every time the stationary dummy is moved. Moreover, it is impossible to measure and mark a preferred placement location when the roping dummy is mobile.

Moreover, it is known that recording a video of a roper while competing or training can be very helpful, as video recording allows the roper to critically observe his stance, positioning, follow-through, and other throwing technique. However, setting up a separate camera tripod can be inconvenient or impractical.

What is needed is a roping training apparatus that easily and consistently communicates to a roper his position relative to the target area of a roping dummy. Also needed is a roping training apparatus that allows a roper to conveniently view his throwing technique, both in real time and after the roping attempt.

2. Related Art

Several patents have been issued for calf roping training apparatuses, such as U.S. Pat. No. 8,297,980 (Reynolds), U.S. Pat. No. 5,080,373 (Jones), and U.S. Pat. No. 6,497,411 (Nelson). None of these patents, however, disclose a system to measure a user's position relative to the dummy and to provide information concerning the roper's displacement, if any, from a preferred roper position. Other prior art discloses video systems for providing user feedback for certain activities such as U.S. Pat. No. 7,018,211 (Birkholzer), U.S. Pat. No. 7,095,388 (Truxa), and US 2003/0044757 A1 (Tarry). These patents disclose systems using a video camera and video monitor to show a user's body position and/or body movement relative to a preferred position or preferred body movement for purposes of improving the positioning and efficacy of such activities as rehabilitation exercises or golf swings. However, none of these systems disclose a camera or other user position sensory device that is disposed on a target at which a remote user is aiming. Moreover, the systems work only if the users practice their movements while remaining confined to one location; in other words, the users must maintain a relatively fixed lateral and longitudinal position relative to the camera(s). None of these systems accommodate a user shifting his/her position relative to the camera, or relative to a remote target.

What is needed is an easily transportable roping training apparatus that infonus a roper of his position relative to a target area on a training dummy, and that simultaneously conveys a preferred or optimal location at which the roper should place himself before throwing his lasso.

SUMMARY OF THE INVENTION

A roping training apparatus is provided for facilitating placement of a remote roper with respect to a roping dummy, which can be stationary or mobile. A dummy body has a head portion, a rear portion, and a lasso target, such as the animal's head, horns, or legs. A sensor is disposed on the dummy to ascertain the roper's position relative to the target area. The position sensor may include a radar system, a video camera, or a combination of both types of sensors. In one embodiment, the position sensor comprises a video camera mounted between the horns at the back of the dummy's head, with the camera pointed rearward. In one embodiment, a monitor is mounted in the rear portion of the dummy easily visible to the roper situated behind the dummy as in a typical roping situation, thereby minimizing interference with the roper's focus and technique. The monitor is operatively connected to the position sensor(s) and displays the roper's real-time placement relative to the target, as well as a helpful real-time view of the roper's throwing technique. The feedback monitor also displays a positional reference corresponding to a preferred roper placement. By displaying the roper's actual position simultaneously with a preferred roper position, combined with the helpful perspective view of his throwing attempts, the roper is able to easily and quickly change his position relative to the dummy and the target area, as well as modify his technique, thereby facilitating a successful capture of the head, horns, or other portion of the dummy's body.

The position sensor may employ a radar system similar to systems commonly found in motor vehicles, such as those embedded in the rear bumper of automobiles to detect the distance between the rear of the vehicle and any rearward obstruction. Like such vehicle backup systems, the radar system in the roping training apparatus may send location information to the roper via visible or audible signals to convey to the roper his real-time location relative to a preferred placement point, or relative to a disfavored placement area. The radar system may be combined with a video camera to display on the monitor the roper's distance and orientation angle from the target, together a positional reference. The positional reference could comprise a single point, gridlines or reticule lines, geometric shapes, shading or contrast on the monitor display, lights, or any other indicia indicating a preferred (or disfavored) roper placement relative to the target. The positional reference could also incorporate audible signals, with the system generating louder or different pitch signals as the roper shifted his position to a more preferred placement.

In another embodiment, stereoscopic video cameras could be used in conjunction with a microprocessor to ascertain distance and angle of orientation between the roper and the target. In other embodiments of the invention, the monitor might display the roper's real-time position by means of images, lights, symbols, or similar means of showing a roper's position relative to the target and relative to a preferred roper placement, and could use similar means to display a preferred positional reference. The apparatus can be adapted to both stationary and mobile roping dummies. In one embodiment, the roper can vary the positional reference, e.g., relocate the positional reference displayed on the monitor a few feet and/or a few degrees. This might be in a variety of means well understood by those skilled in the art, for example, by modifying display features of the monitor, by adjusting placement or orientation of the position sensor, or by processing the position reference signal sent by the position sensor before it is converted and displayed on the monitor.

Other embodiments of the invention include a recording device to record the data generated by a roper's ensnarement attempts and successes at various placement points relative to the target, and configuring a microprocessor to process and/or modify the positional reference data displayed on the monitor. This could be especially valuable, for example, to play back a recording of one or more throwing attempts and successes, to better identify defects in the thrower's technique. Incorporating a microprocessor also enables the system to modify the positional reference and preferred roper placement based not only on input provided by the user, but also based on analysis of a roper's history of roping attempts and successes at a variety of placement locations. For example, if a roper achieves a higher ensnarement rate when he is 15 feet away and 20 degrees off center versus 15 feet away and 10 degrees off center, the system may be programmed to shift the positional reference displayed on the monitor to a new preferred placement corresponding to the placement where that roper has more consistent success.

When a microprocessor is incorporated, those skilled in the relevant art will appreciate that data can be transferred to and/or from memory accessible by the microprocessor, and that such data might include roper historical data, positioning modifications, software updates, and remote access to data relating to the roper and training apparatus. Such data could be transferred by a variety of common means, including flash memory device or a wireless connection.

The present invention provides a superior means of training to successfully rope calves and steers by facilitating proper roper placement relative to the target and by facilitating observation of one's technique, both in real time and after one or more attempts. The invention is also adaptable for use in conjunction with existing roping dummy models without extensive modifications.

BRIEF DESCRIPTION OF THE DRAWINGS

These and other features and advantages of the present invention will become more readily appreciated when considered in connection with the following detailed description and appended drawings, wherein.

DETAILED DESCRIPTION

Figure 1:
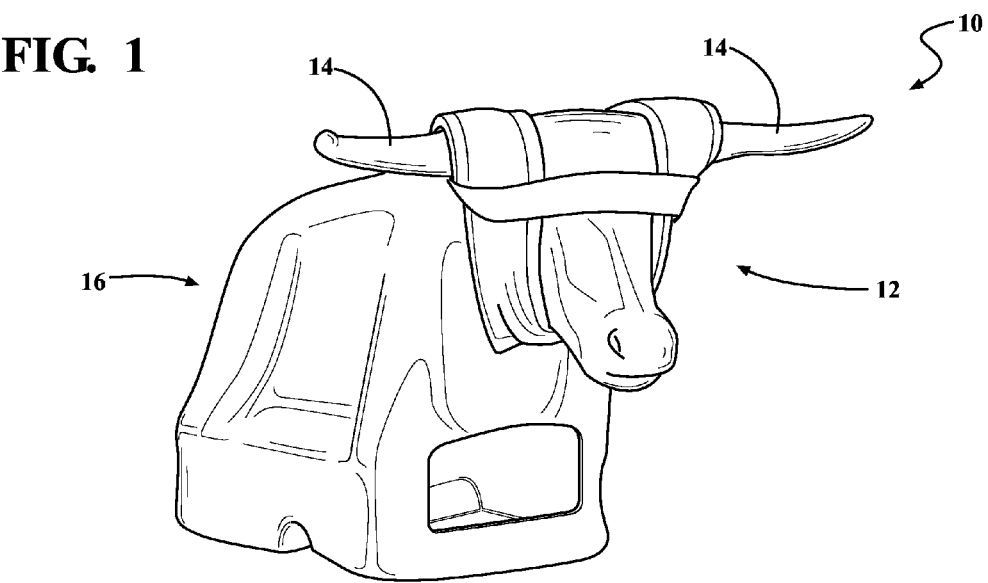
FIG. 1 is a perspective view of a typical stationary roping dummy.
Figure 2:
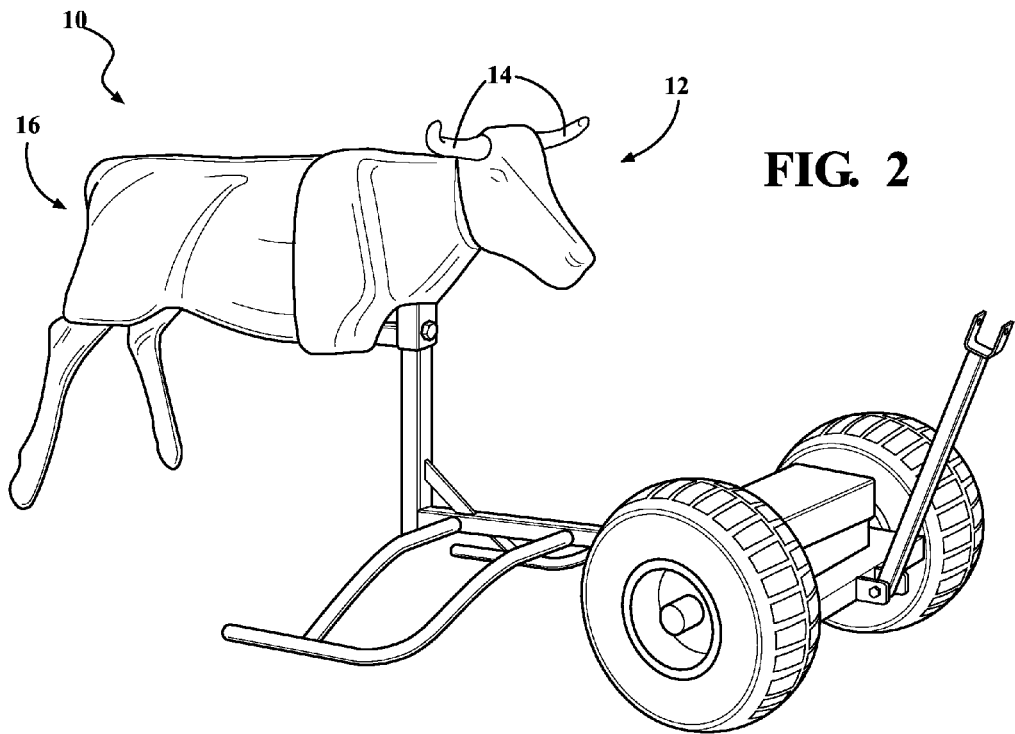
FIG. 2 is a perspective view of a typical mobile roping dummy adapted to be pulled by an ATV or other motor vehicle.

Referring to FIG. 1, a stationary dummy 10 is shown having a front portion 12, horns 14 and rear portion 16. As shown in the figure, different sizes of horns 14 may be attached to the calf roping dummy 10 according to a desired age and species of steer, with calves having no horns and young animals having shorter horns, for example. FIG. 2 shows a roping dummy 10 designed for mobile application, again having front portion 12, horns 14 and rear portion 16. Such dummies are commercially available from the Heel-O-Matic company, Longmont, Colo.

Figure 3:
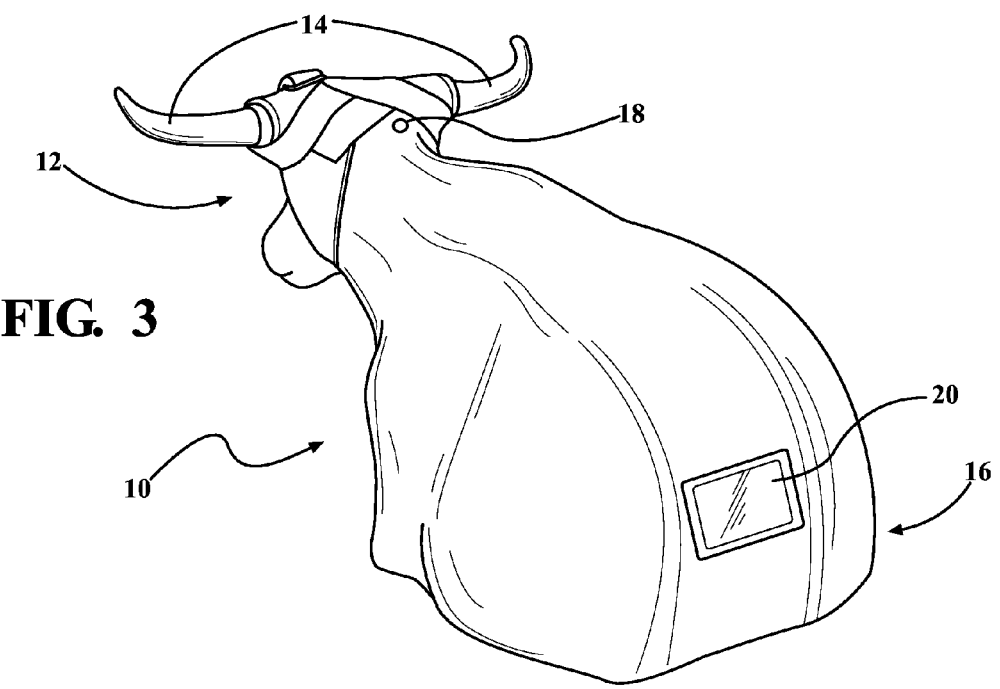
FIG. 3 is a perspective view of a stationary roping dummy showing a position sensor and monitor installed on the dummy.

FIG. 3 shows a stationary steer roping dummy 10 having front portion 12, horns 14 and rear portion 16. Also shown is a position sensor 18 mounted at the back of the dummy's head between horns 14. Position sensor 18 may be a video camera aimed rearward to capture images of a roper on foot in position to throw a rope over a target, such as the head or horns 14. Position sensor 18 could also incorporate a radar system comprising a radar transmitter and radar receiver. Alternatively, position sensor 18 could be a combination of a radar system and a video camera system. Alternatively, position sensor 18 could comprise a stereoscopic camera system capable of measuring distance between the target area and the user with suitable processing of the video signals generated by the two cameras.

FIG. 3 also shows a monitor 20 mounted in the hind quarters or rear portion 16 of dummy 10. In a preferred embodiment, position sensor 18 and monitor 20 both face rearward from the dummy 10 and towards a roper who typically throws from a position generally behind the dummy and frequently at an angle from the center line of the dummy. When using a video camera embodiment, such positioning of monitor 20 allows the roper to observe his throwing technique in real-time, as well as after one or more throwing attempts. In one embodiment, not shown, position sensor 18 could be mounted in such a way as to be adjustable to the left or right side of the dummy 10 depending on the roper's preference. Similarly, monitor 20 could be mounted in such a way as to tilt or pivot left to right, or up and down, to achieve a comfortable viewing angle optimized for the user and his preferred placement position.

Figure 4:
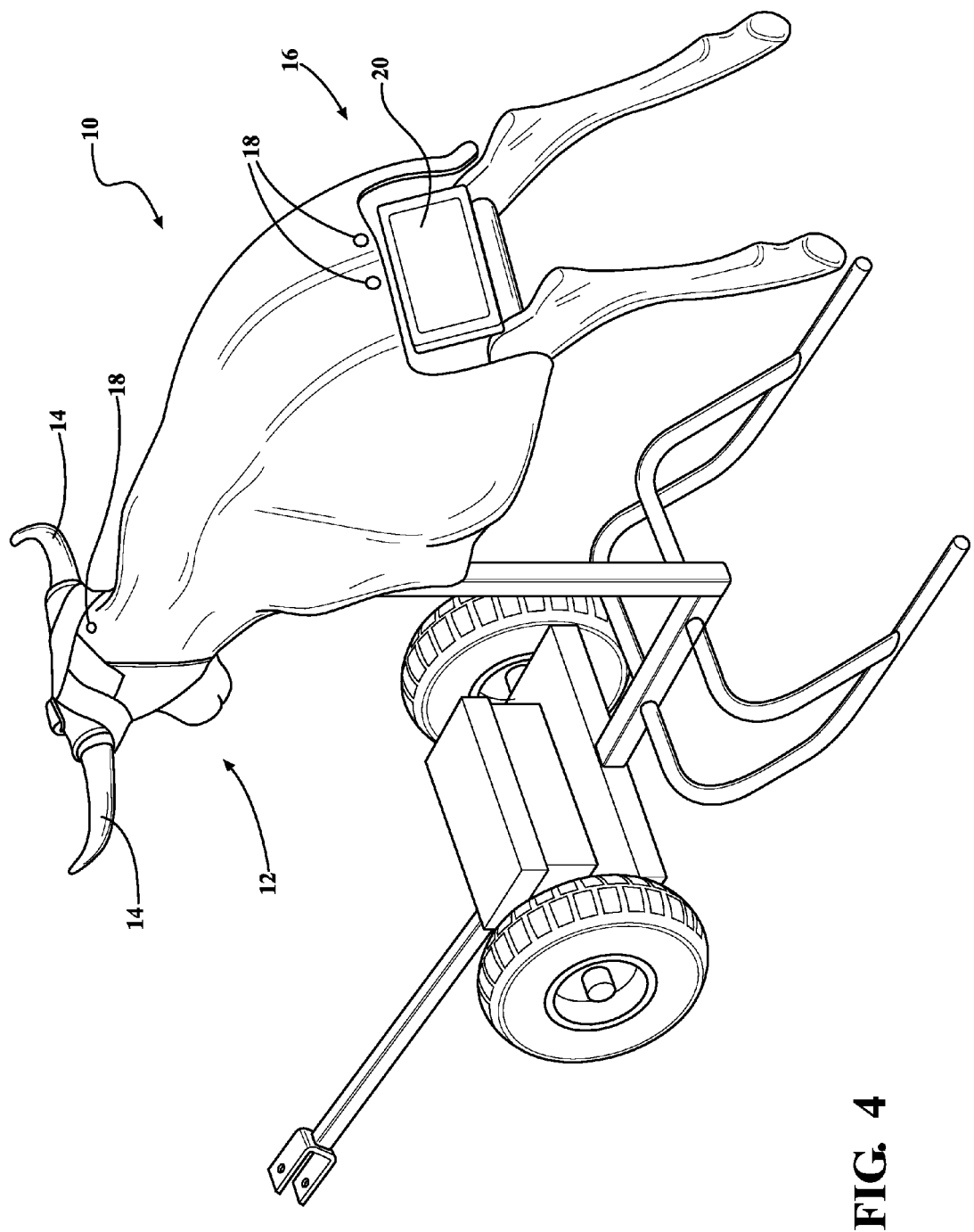
FIG. 4 is a perspective view of a position sensor system and monitor installed on a mobile dummy.

Moving to FIG. 4, a mobile dummy 10 is shown, again having a position sensor 18 mounted between horns 14 in the front portion 12 of the dummy 10 and a monitor 20 mounted in the rear portion 16. Also shown in FIG. 4 are two additional position sensors 18 mounted in the rear portion 20 of the dummy 10. As shown in this embodiment, the position sensor 18 is disposed between the horns 14 and could be a video camera, while the position sensor 18 mounted in the rear portion 16 of the dummy could be a radar positioning system. Both position sensor systems monitor the real-time position of the roper relative to the lasso target, for example horns 14. Both position sensor systems are operatively connected to the monitor 20 to display the roper's real-time position. As discussed above, the roper's real-time position could be displayed as a video image, as a steady or flashing point of light, as a geometric shape, as intersecting lighted lines, or displayed by other well known means.

Figure 5:
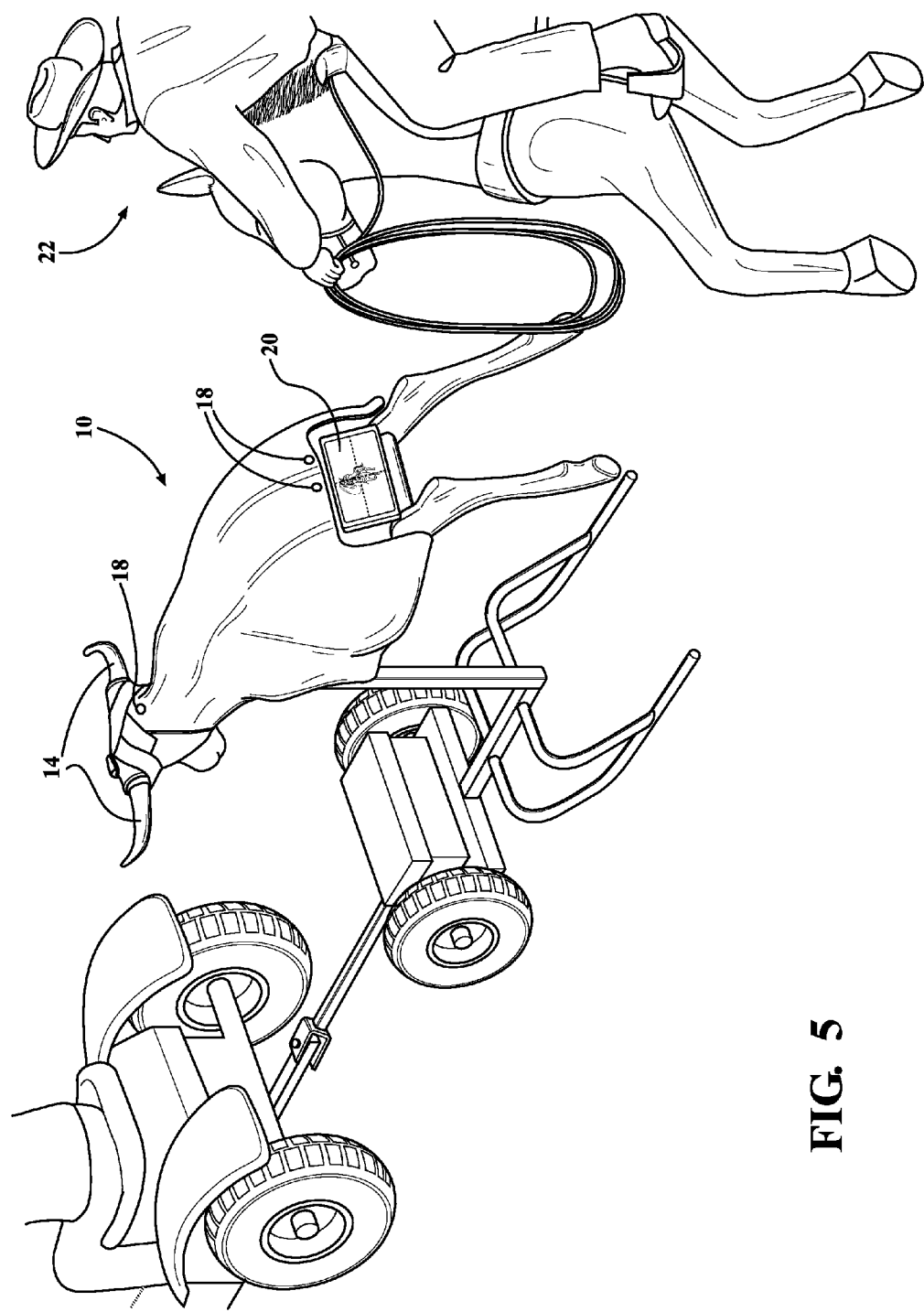
FIG. 5 is a perspective view of a mobile dummy showing the roping training apparatus together with a user in position to rope the dummy.

Moving to FIG. 5, the mobile roping training apparatus is shown together with a remotely stationed roper 22 placing himself in position to throw his lariat onto the dummy's target area, which could be horns 14 or the dummy's hind legs. For purposes of this specification and the claims, "stationed" includes both stationary and mobile ropers. Mounted in the dummy's hindquarters is a monitor 20. In the embodiment shown, monitor 20 displays an image of roper 22 captured by a video camera functioning as a position sensor 18, in this case mounted at the back of the dummy's head portion 12 and between horns 14. Also shown in the monitor 20 of FIG. 5 are gridlines or a reticule centered in the monitor, serving as a positional reference and corresponding to a proper placement for roper 22. For purposes of this specification and the claims, "corresponding to" a proper roper placement does not necessarily mean the positional reference identifies the optimal roper placement. For example, a roper may determine that best results are obtained when he positions himself slightly lower and to the left of the intersecting gridlines. In this instance, the intersecting gridlines nevertheless correspond to a proper roper placement.

The monitor may include lines, shading, or shapes—either formed as part of the monitor or displayed electronically—that serve a positional reference. For example, a roper may be optimally positioned when his image fills a designated portion of the monitor screen; if the roper is too close, his image might be too large, and if he is too far away, his image might be too small. The positional reference could also include digits, a series of progressive lights, or other indicia indicating optimal distance or angular orientation. Whether conveyed via an image, lights, digits, sound, or some combination of the foregoing, the information on the monitor conveys the roper's position relative to the target and a positional reference corresponding to a preferred placement. Combined with real time placement information known by the roper (e.g., "I'm about 10 feet behind and slightly left of the dummy"), the information displayed on the monitor allows the roper to gauge his lateral and longitudinal position relative to the target and relative to his preferred placement location, facilitating his optimal placement to throw the lariat and ensnare the target.

Figure 6:
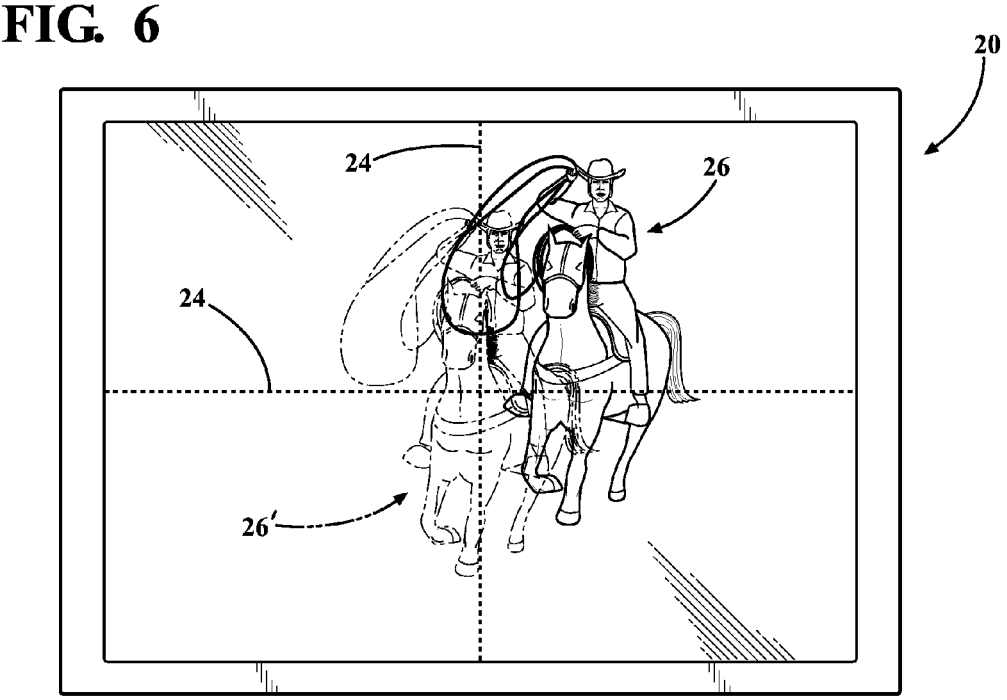
FIG. 6 is an enlarged view of a monitor showing a roper in his actual position, reticule lines as a positional reference, and a phantom outline indicating the preferred placement for the roper centered on the reticule lines.

FIG. 6 is an enlargement of the monitor 20 shown in FIG. 5. The monitor 20 shown in FIG. 6 depicts an image of a roper 22 shown in the roper's actual position 26 and reticule lines or gridlines 24 comprising a positional reference, with the intersection of the lines indicating a preferred placement for the roper 22 to throw his rope to ensnare the target area. Again, the size of the monitor screen, or lines, shapes, lights or shading on the monitor, may function as a position reference, e.g., a larger image could correspond to a shorter distance between the roper and target. Moreover, although not shown in FIG. 6, the position reference could include a series or plurality of lines, shapes or areas indicating preferred roper placement positions as relatively better or worse. For purposes of this specification and the claims, when used in connection with positional reference, "a plurality of visible lines" includes positional references that incorporate reticules, gridlines, straight lines, curved lines, shading, and shapes.

FIG. 6 shows a feedback monitor 20 displaying the roper's actual real-time position 26 as an image, thereby communicating information to the roper concerning not only his longitudinal and lateral position, but also his throwing form and technique. The position sensor 18 has detected his actual position then transmitted a video image signal to monitor 20, which displays his position as slightly above and to the right of the intersecting gridlines 24. The roper may desire to place himself at a preferred placement 26' whereby his image would then appear in the center of the intersecting gridlines 24. The positional reference information in this example includes the gridlines 24 and the size of image 26 shown on monitor 20. The roper determines to center his image 26 at a preferred placement location 26'. He thus rides slightly to his right and a little closer to the dummy to a preferred placement, in this case resulting in his real-time image shifting from position 26 to 26'. He could also determine from the image shown on the monitor to alter his technique, such as extending his throwing arm.

Figure 7:
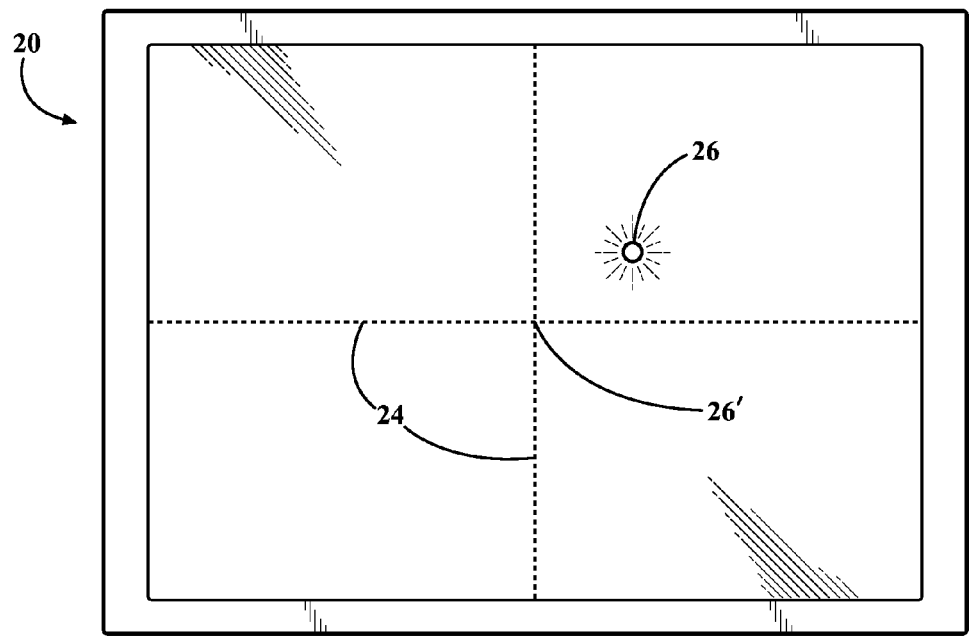
FIG. 7 is another embodiment of a monitor showing the roper's actual real-time position as a point of light and reticule lines as a positional reference indicating the roper's preferred placement.

FIG. 7 is an alternative embodiment of monitor 20. In this embodiment, the monitor does not show the roper as a two-dimensional image but rather as a moving point of light, shown on the monitor in real-time location 26. As in the previous embodiment, monitor 20 displays a positional reference in the form of intersecting gridlines 24. The intersection of gridlines 24 correspond to a preferred roper placement 26'. The display showing the roper's actual location 26 could be depicted as an image, a light, a symbol, or figure. Regardless of how the roper's actual position 26 is depicted on monitor 20, his actual position 26 will be displayed relative to a positional reference, here intersecting gridlines 24, and relative to a preferred roper placement 26'.

Figure 8:
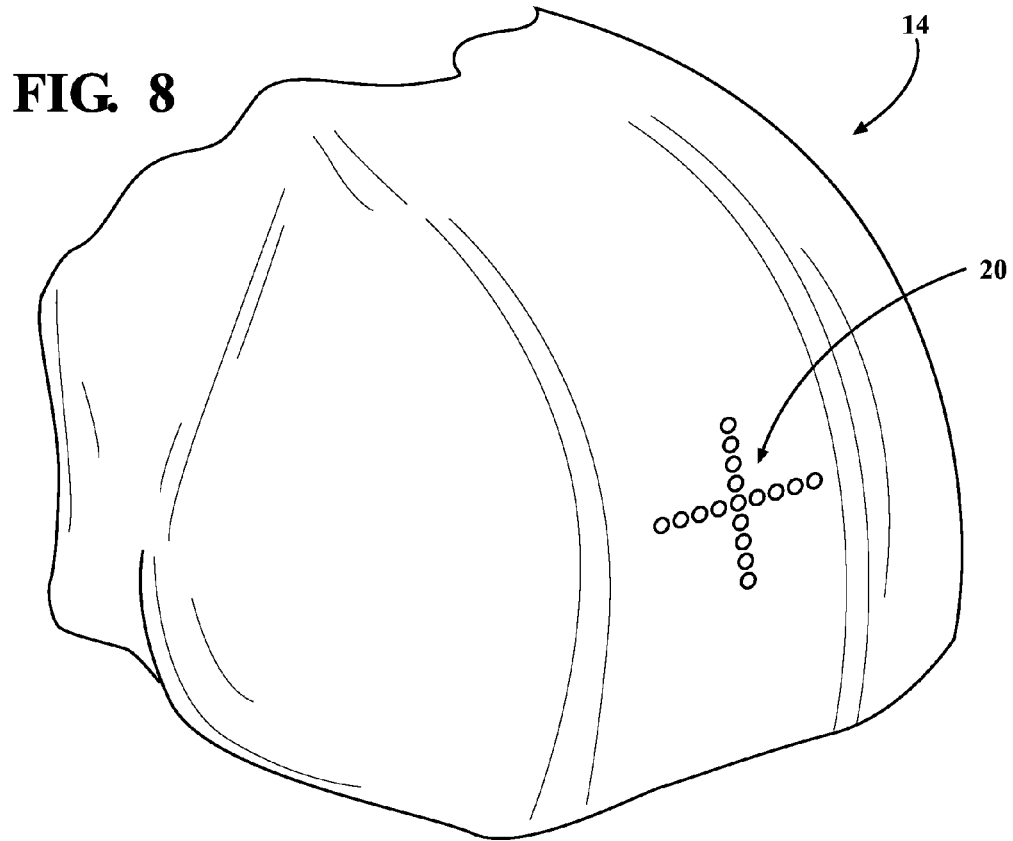
FIG. 8 is a perspective view of the hind portion of a roping dummy showing a monitor comprised of simple cross of two lines of light emitters, with the roper's actual real-time position designated by a combination of lighted emitters and the positional reference indicating a preferred roper placement at the intersection of the emitters.

Turning to FIG. 8, the dummy's rear portion 14 is shown with a monitor 20 in a more basic embodiment comprising a simple cross of two intersecting lines of emitting lights. Here, the positional reference are the lines of emitting lights, with the intersection of the cross corresponding to a preferred roper placement. The depiction of the roper's actual location 26 (not shown in FIG. 8) could be depicted by a combination of lights on the vertical or horizontal axis, with the vertical emitters responsive to longitudinal distance from the target, and the horizontal emitters responsive to lateral distance from the target. In this embodiment, if all the emitters in the upper and right portions of the cross were lighted, it would signify a large displacement between the roper's real-time position 26 and the roper's preferred placement 26', both longitudinally and laterally relative to the centerline of the dummy. Conversely, if only the very center of the cross were lighted, it could signify the roper's actual position was the same as his preferred placement.

Other embodiments of the roping training apparatus include a device to record data relating to a roping event involving roper 22 and dummy 10. The data could include the identity of the roper, date, weather conditions, the identity of the horse, and a plurality of roping attempts and successes, together with the roper's position relative to the preferred roper placement for each of his attempts. The recording feature could be a video record that is accessible by a removable memory card, wireless transmission, or other magnetic media. The recording feature could be combined with a computer processor configured to detect and record a roper's actual real-time position relative to the roper's preferred placement, as well as whether or not the roper's throw attempt was successful. The apparatus could be configured to play back video recordings on the monitor, so that the roper could view them shortly after a throw. To facilitate convenient review, the monitor and playback mechanism could be configured to operate via a infrared remote control, to the roper could review his technique immediately following an attempt. The record feature could assemble a history of attempts and successes and correlate them with roper position as well as the dummy's speed, travel direction, and other variables, such as the horse on which the roper was mounted, the driver of the motor vehicle pulling the dummy, and assemble this information in a data format downloadable and accessible by the user, such as through a USB flash drive.

In yet another embodiment, the training apparatus could include an audio system having prerecorded sounds, amplifier and speaker. When a roper successfully captured the horns, the audio system could be programmed to emit sounds of a crowd cheering. When the misses, the system could be programmed to transmit sounds of a crowd groaning. The audio system could also be easily configured to play audio files, such as mp3 files stored on a removable memory device or digital or analog music acquired through a satellite or radio tuner. The audio, video, and associated electronics may be housed in a water- and shock-resistant housing to withstand the rigors of outdoor use.

In another embodiment, the apparatus could include an auxiliary camera separate from roper position sensor 18 configured to record a larger perspective view of the roper 22 in action. The system could be configured to record the data generated by the auxiliary camera concurrently with the recording of the signal being transmitted from position sensor 18 to monitor 20. Upon playback, a roper could observe the image that was shown on monitor 20 at the same time the roper 22 observes his performance from other perspectives, thereby assisting in the training process and adding entertainment value.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A roping training dummy comprising:
   a dummy body representing an animal to be lassoed by a remotely stationed roper, said body comprising a head portion and a rear portion;
   a lasso target disposed on the body, said target configured to be ensnared by a loop of rope thrown by the roper;
   a position sensor disposed on the dummy for monitoring the real-time position of the roper relative to the lasso target; and
   a visual feedback monitor disposed on the dummy and operatively connected to the position sensor, said monitor displaying the roper's real-time position and a positional reference corresponding to a preferred roper placement.

2. The dummy of claim 1 wherein a longitudinal and lateral displacement between the roper's real-time position and the roper's preferred placement is discernible on the monitor display.

3. The dummy of claim 2 wherein the positional reference is configurable by the roper.

4. The dummy of claim 2 further comprising a microprocessor.

5. The dummy of claim 4 further comprising a device for recording data associated with a plurality of the roper's ensnarement attempts and successes and a corresponding plurality of roper positions relative to the lasso target.

6. The dummy of claim 5 wherein the microprocessor uses the recorded data to modify the positional reference.

7. The dummy of claim 1 wherein the position sensor comprises a radar transmitter and receiver system.

8. The dummy of claim 1 wherein the position sensor comprises a video camera, the monitor is a video monitor, and the monitor displays an image of the roper.

9. The dummy of claim 8 wherein the position sensor comprises a video camera proximate to the target area.

10. The dummy of claim 1 wherein the lasso target area comprises horns installed on the head portion.

11. The dummy of claim 10 further comprising a second target area comprising at least one leg attached to the dummy's rear portion.

12. The dummy of claim 1 wherein the monitor is proximate to the dummy's rear portion.

13. The dummy of claim 1 wherein the monitor displays a symbol representing the roper's position.

14. The dummy of claim 1 further comprising an audio system for producing sounds in response to ensnarement attempts and successes.

15. The dummy of claim 14 further comprising an auxiliary audio input.

16. The dummy of claim 1 further comprising an auxiliary video camera attached to the dummy.

17. The dummy of claim 1 wherein the positional reference is denoted on the monitor by a positional reference point.

18. The dummy of claim 1 wherein the positional reference is denoted on the monitor by a plurality of visible lines.

19. A roping training dummy comprising:
   a dummy body representing a bovine animal to be lassoed by a remotely stationed roper, said dummy body comprising a bovine anatomical feature configured to be ensnared by a lasso;
   a video camera disposed on the dummy for monitoring the roper; and
   a rearward facing visual feedback monitor disposed on the dummy and operatively connected to the video camera.

20. A method of training a roper comprising:
   providing a dummy body comprising a target configured to be ensnared by a loop of rope thrown by a roper, a position sensor disposed on the body relative to the target, and a visual feedback monitor disposed on the body and operatively connected with said position sensor, said monitor displaying positional reference information;
   positioning the roper remotely from the dummy body;
   detecting the roper's position relative to the target;
   transmitting a signal from the position sensor to the monitor; and
   displaying on the monitor the roper's position relative to the positional reference information.

* * * * *